US011975945B1

(12) United States Patent
Zabran

(10) Patent No.: US 11,975,945 B1
(45) Date of Patent: May 7, 2024

(54) FRICTIONLESS SAFETY BRAKE ACTUATOR

(71) Applicant: Otis Elevator Company, Farmington, CT (US)

(72) Inventor: Mikhail Zabran, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/994,547

(22) Filed: Nov. 28, 2022

(51) Int. Cl.
*B66B 5/18* (2006.01)

(52) U.S. Cl.
CPC ...................................... *B66B 5/18* (2013.01)

(58) Field of Classification Search
CPC .................................... B66B 5/18; B66B 5/04
See application file for complete search history.

(56) References Cited

U.S. PATENT DOCUMENTS

| | | | | |
|---|---|---|---|---|
| 1,839,235 | A | 1/1932 | Lindstrom | |
| 5,931,263 | A * | 8/1999 | Ericson | B66B 5/18 187/373 |
| 6,105,738 | A | 8/2000 | Christen | |
| 7,267,201 | B2 | 9/2007 | Ito | |
| 7,299,898 | B2 | 11/2007 | Husmann | |
| 7,398,863 | B2 | 7/2008 | Liebetrau et al. | |
| 8,511,437 | B2 | 8/2013 | Glaser et al. | |
| 8,662,264 | B2 | 3/2014 | Legeret | |
| 8,991,561 | B2 | 3/2015 | Husmann | |
| 9,027,714 | B2 | 5/2015 | Husman et al. | |
| 9,169,104 | B2 | 10/2015 | Legeret et al. | |
| 9,206,015 | B2 | 12/2015 | Osmanbasic et al. | |
| 9,309,091 | B2 | 4/2016 | Husmann | |
| 9,850,094 | B2 | 12/2017 | Husmann | |
| 9,981,827 | B2 | 5/2018 | Osmanbasic et al. | |

(Continued)

FOREIGN PATENT DOCUMENTS

| | | | | |
|---|---|---|---|---|
| CN | 207361553 U | | 5/2018 | |
| CN | 112209200 A | * | 1/2021 | B66B 5/0087 |

(Continued)

OTHER PUBLICATIONS

European Search Report for Application No. 23154945.2, dated Aug. 22, 2023, 8 Pages.

*Primary Examiner* — Diem M Tran
(74) *Attorney, Agent, or Firm* — CANTOR COLBURN LLP

(57) ABSTRACT

A frictionless safety brake actuator (100), a braking system, and an elevator system. The frictionless safety brake actuator (100) for use in an elevator system, includes: a fixed component (110); a movable component (130), configured to be moveable between a first position in which a safety brake is actuated and a second position in which the safety brake is not actuated; a biasing element (120) arranged between the fixed component (110) and the movable component (130) to apply a biasing force to the movable component (130) to bias the movable component (130) away from the fixed component (120) towards the first position; an actuating element (140) connected to the movable component (130); a holding arrangement (150) comprising a latch (154) and a first actuator (152), wherein the first actuator (152) is configured to be selectively operable to move the latch (154) between a holding position and a release position.

17 Claims, 7 Drawing Sheets

(56) References Cited

U.S. PATENT DOCUMENTS

| | | | |
|---|---|---|---|
| 10,023,430 | B2 | 7/2018 | Studer et al. |
| 10,266,373 | B2 | 4/2019 | Zou et al. |
| 10,494,227 | B2 | 12/2019 | Hu et al. |
| 10,584,014 | B2 | 3/2020 | Fauconnet et al. |
| 10,781,075 | B2 | 9/2020 | Witczak et al. |
| 11,427,436 | B2 | 8/2022 | Koskinen et al. |
| 2020/0283267 | A1 | 9/2020 | Lindström |

FOREIGN PATENT DOCUMENTS

| | | | | | |
|---|---|---|---|---|---|
| CN | 111032554 | B | | 7/2021 | |
| CN | 113165838 | A | | 7/2021 | |
| CN | 112110312 | B | | 12/2021 | |
| CN | 113994118 | A | | 1/2022 | |
| CN | 114604711 | A | * | 6/2022 | |
| EP | 1562721 | B1 | | 5/2006 | |
| EP | 2714565 | B1 | | 1/2015 | |
| EP | 3170781 | A1 | | 11/2016 | |
| EP | 3519339 | A1 | | 8/2019 | |
| EP | 3789335 | B1 | | 7/2022 | |
| KR | 102173779 | B1 | | 11/2020 | |
| WO | WO-2006064555 | A1 | * | 6/2006 | ............... B66B 5/04 |
| WO | 2013070234 | A1 | | 5/2013 | |
| WO | 2021069739 | A1 | | 4/2021 | |
| WO | 2021160815 | A1 | | 8/2021 | |

* cited by examiner

FRICTIONLESS SAFETY BRAKE ACTUATOR

TECHNICAL FIELD

This disclosure relates to elevator systems, and frictionless safety brake actuators and braking systems for use in an elevator system.

BACKGROUND

It is known in the art to mount safety brakes onto elevator components moving along guide rails, to bring the elevator component quickly and safely to a stop, especially in an emergency. In many elevator systems the elevator car is hoisted by a tension member with its movement being guided by a pair of guide rails. Typically, a governor is used to monitor the speed of the elevator car. According to standard safety regulations, such elevator systems must include an emergency braking device (known as a safety brake, “safety gear” or “safety”) which is capable of stopping the elevator car from moving upwards or downwards, even if the tension member breaks, by gripping a guide rail. Safety brakes may also be installed on the counterweight or other components moving along guide rails.

Electronic Safety Actuators (ESA’s) are now commonly used instead of using mechanical governors to trigger a safety brake, e.g. using electronic or electrical control. ESA’s typically activate a safety brake by controlled release of a magnet (either a permanent magnet or an electromagnet) to drag against the guide rail, and using the friction resultant therefrom to pull up on a linkage attached to the safety brake. The reliance on the friction interaction between a magnet and the guide rail has a number of potential complexities, especially in high-rise elevator systems, as the interaction between the magnet and the guide rail causes wear on the guide rail, and can induce chipping, as well as debris accumulation.

There is therefore a need to improve safety actuation of the safety brakes.

BRIEF DESCRIPTION

According to a first aspect of this disclosure there is provided frictionless safety brake actuator for use in an elevator system. The frictionless safety brake actuator comprising: a fixed component; a movable component, configured to be moveable between a first position in which a safety brake is actuated and a second position in which the safety brake is not actuated; a biasing element arranged between the fixed component and the movable component to apply a biasing force to the movable component to bias the movable component away from the fixed component towards the first position; an actuating element connected to the movable component, wherein the actuating element is configured to actuate a safety brake so as to move the safety brake into frictional engagement with an elevator guide rail; a holding arrangement comprising a latch and a first actuator, wherein the first actuator is configured to be selectively operable to move the latch between a holding position and a release position; wherein, in the holding position, the latch is configured to prevent movement of the movable component in the second position, and wherein the first actuator is configured move the latch into the release position to allow the biasing force of the biasing element to move the movable component from the second position to the first position; and a reset system comprising a gear and a second actuator, wherein the gear is configured to engage with the actuating element; and wherein the second actuator is configured to drive the gear to move the movable component from the first position to the second position against the biasing force of the biasing element.

It will be appreciated that, according to the present disclosure, the frictionless safety brake actuator provides actuation for a safety brake, without the aid of frictional contact between the electronic safety actuator and the guide rail. This provides the advantage that actuation of the safety brake is not affected by the state of the elevator guide rail, so no debris from the elevator hoistway or dirt from the elevator guide rail can interfere with the actuation of the frictionless safety brake actuator.

It will furthermore be appreciated that the location of the frictionless safety brake actuator is no longer restricted by the need for contact with the guide rail, and can be positioned anywhere on an elevator component where the actuating element can actuate the safety brake. Therefore, in some examples no component of the frictionless safety brake actuator comes into frictional contact with the elevator guide rail.

It will be understood by the skilled person that the actuating element provides the actuation movement which actuates the safety brake. The actuating element may connect to a linkage which then actuates the safety brake. The actuating element may be a linkage which directly actuates the safety brake. The movement of the linkage can be a vertical movement aimed to push or pull the safety brake into engagement with the elevator rail. In other examples the movement of the linkage can be in any direction so as to move the safety brake into a position of engagement with the elevator guide rail.

It will be appreciated that, according to the present disclosure, the reset system drives the movement of the movable component against the biasing force of the biasing element to reset the system. The return of the movable component to the second position, where it is held in place by the latch in the holding position, can be known as a reset procedure. When the frictionless safety brake actuator is activated, the reset system does not interfere with the movement of the actuating element, so there is no resistance against the triggering mechanism. In some examples, the gear is only engaged with the actuating element during the reset procedure. In some examples the gear is moved into engagement with the actuating element for the second actuator to drive the gear to move the movable component from the first position to the second position against the biasing force of the biasing element, and moved out of engagement with the actuating element once the movable component is held in the second position by the holding arrangement. In some examples, the second actuator is disengaged from the gear once the movable component is held in the second position by the holding arrangement. In this example, the gear can freely spin with the movement of the actuating element when the biasing force of the biasing element moves the movable component from the second position to the first position.

In some examples, the reset system and the holding arrangement are provided independent of one another. In some examples, the reset system and the holding arrangement are combined into a single arrangement. In some examples, the gear of the reset system acts as the latch of the holding arrangement.

In some examples, the holding arrangement and/or the reset system are positioned between the movable component and the safety brake. In some examples the holding arrangement and/or the reset system are positioned above the movable component. It will be appreciated that the holding arrangement can be reasonably located anywhere so as to hold the movable component in during normal operation, and release the movable component for actuation of the safety brake. In some examples, the latch directly interacts with the movable component. In some examples, in the holding position, the latch is configured to engage with the actuating element. In some examples, the holding arrangement is configured such that when the latch is engaged with the actuating element in the holding position: the holding arrangement prevents movement of the actuating element in a first direction corresponding to the movement of the movable component from the second position to the first position; and the holding arrangement does not restrict movement of the actuating element in a second direction corresponding to the movement of the movable component from the first position to the second position.

It will also be appreciated that the reset system can reasonably be located anywhere to interact with the actuating element to drive the motion of the movable component back to the second position during a reset procedure. In some examples the reset system and the holding arrangement are positioned close together, e.g. for ease of electrical access to the components from any outside electronic or electrical control.

In some examples, the actuating element is a rack and the gear is a pinion, e.g. a rotational movement of the gear translates to a linear motion of the actuating element.

The second actuator can be any actuating mechanism which can control the rotation of the gear to control the movement of the actuating element. In some examples, the second actuator is a motor, configured to drive the rotation of the gear. The motor may be electrically or electronically controlled. In some examples, the second actuator is a stepper motor. The stepper motor allows for precise rotational movement of the gear, which can easily control the distance the actuating element moves to move the movable component from the first position to the second position.

In some examples the gear comprises teeth that engage with the actuating element for part of the rotation of the gear, and no teeth for another part of the rotation of the gear so as not to engage with the actuating element. In this example, the gear is positioned so as not to engage with the actuating element during normal operation, so the actuation of the safety brake has no resistance from the reset system. This configuration has the advantage that there are no components to interfere with the triggering of the safety brake, increasing the efficiency of the frictionless safety brake actuator, and making the frictionless safety brake actuator more reliable.

It will be appreciated that by using a stepper motor the exact rotation of the gear can be simply controlled without the need for feedback from any additional components. A stepper motor is preferably used in combination with a gear with teeth only on part of the arc of rotation, so the gear is controlled to be in the correct position for normal operation and controlled to engage with the actuating element during the reset procedure.

In some examples, the biasing element is a compression spring. In some examples, the compression spring is a mechanical coil. The compression spring may be arranged coaxially with the movable component. In other examples, the biasing member can be a pneumatic spring. In some examples, the biasing element can be a hydraulic spring. In some examples, the biasing element can be an elastomer spring. It will be appreciated that the biasing element is required to have a repeatable, and predictable biasing force which can move the movable component. For example, a compression spring, with a defined spring constant, will be suitable for providing a required biasing. The properties of the biasing element can be chosen for the type of safety brake being used and the elevator component being braked (e.g. an elevator car, or a counterweight).

The first actuator is designed to move the latch between the holding position and the release position. The first actuator may be any suitable actuator which can provide for the desired consistent movement of the latch, whilst providing resistance against the biasing force created by the biasing element. In some examples, the first actuator is a linear solenoid. In some examples the first actuator is a motor. In some examples the first actuator is a servo. In some examples, the first actuator is a rotary solenoid arranged to move the latch between the holding position and the release position. In some examples the holding arrangement further comprises an element to bias the latch. In some examples the element to bias the latch is a spring. In some examples the spring is an integral part of the first actuator. In some examples the spring is an integral part of the rotary solenoid. In some examples the spring is an additional component separate to the first actuator. In some examples the spring is a torsion spring. In some examples, the holding arrangement comprises a torsion spring configured to bias the latch to the release position.

In some examples, the frictionless safety brake actuator is designed as a failsafe system, so that when the frictionless safety brake actuator is not powered, it automatically actuates the safety brake. In some failsafe examples, the first actuator is configured to be activated to move the latch to the holding position and keep the latch in the holding position. In some examples, the rotary solenoid is configured to be activated to move the latch to the holding position and keep the latch in the holding position. In these examples, the first actuator is powered to keep the movable component in the second position, and deactivated (i.e. the first actuator has no power) to move the latch to the release position to allow for the actuation of the safety brake. The rotary solenoid can be configured to be deactivated to move the latch out of engagement with the actuating element to allow for actuation of the safety brake. It will be appreciated that in this manner, either a deliberate deactivation of the rotary solenoid, or if the rotary solenoid were to have no power for another reason (e.g. a power outage to the elevator system), the frictionless safety brake actuator will automatically actuate the safety brake. In some examples, the holding arrangement comprises a torsion spring configured to bias the latch out of engagement with the actuating element. The use of a torsion spring in some failsafe examples of the frictionless safety brake actuator ensure the latch moves to the release position, even when the first actuator (e.g. the rotary solenoid) does not have sufficient force to pull the latch from engagement. It will be appreciated that this failsafe system is particularly advantageous, as it increases the reliability of the frictionless safety brake actuator, increasing the safety of the elevator system.

In some examples, the frictionless safety brake actuator is designed as a non-failsafe system. In some examples, the first actuator is configured to be deactivated to move the latch to the holding position and keep the latch in the holding position. In some examples, when the first actuator is a motor, the motor is activated in a first direction to move the latch into the holding position, and the motor is activated in a second direction (e.g. opposite to the first direction) to move the latch into the release position. In some examples, when the first actuator is a rotary solenoid, the rotary solenoid is configured to be deactivated to engage the latch to move the latch to the holding position and keep the latch in the holding position i.e. to keep the movable component in the second position. The rotary solenoid can be configured to be activated to move the latch into the release position to allow for actuation of the safety brake. In some examples, the holding arrangement comprises a torsion spring configured to bias the latch into engagement with the actuating element. It will be appreciated that the non-failsafe system requires no power to the frictionless safety brake actuator during normal operation, so has the advantage of being more energy efficient.

The skilled person will appreciate that there are various methods of control for the frictionless safety brake actuator. In some examples the frictionless safety brake actuator is controlled by a controller, and some other examples the frictionless safety brake actuator is operated using a simple switch or triggering mechanism. In some examples, the frictionless safety brake actuator additionally comprises a position sensor, which can feedback the position of the movable component and/or the actuating element to a controller which controls the holding arrangement and the reset system.

According to a second aspect of the present disclosure there is provided a braking system for use on a movable component in an elevator system. The braking system comprising: a safety brake; and a frictionless safety brake actuator as described above; wherein the actuating element is configured to actuate the safety brake so as to move the safety brake into frictional engagement with an elevator guide rail.

The actuating element of the frictionless safety brake actuator may be a linkage which directly actuates the safety brake. The braking system may further comprise a linkage which connects the actuating element to the safety brake, wherein the linkage transmits the actuation force provided by the actuating element to the safety brake.

In some examples the braking system comprises a controller. The controller may monitor the state (e.g. the position of the movable component and/or the actuating element) of the safety brake and/or the frictionless safety brake actuator. The controller may control the frictionless safety brake actuator.

According to a third aspect of the present invention, an elevator system is provided. The elevator system comprising: a guide rail; an elevator component movable along the guide rail; and the braking system as described above.

The elevator component may be an elevator car. The elevator component may be a counterweight. The elevator system may comprise a controller. The elevator system controller may control the braking system or the frictionless safety brake actuator. The elevator system controller may be a separate controller to the braking system controller and/or the frictionless safety brake actuator controller.

BRIEF DESCRIPTION OF THE DRAWINGS

Certain preferred examples of this disclosure will now be described, by way of example only, with reference to the accompanying drawings, in which.

DETAILED DESCRIPTION

Figure 1:
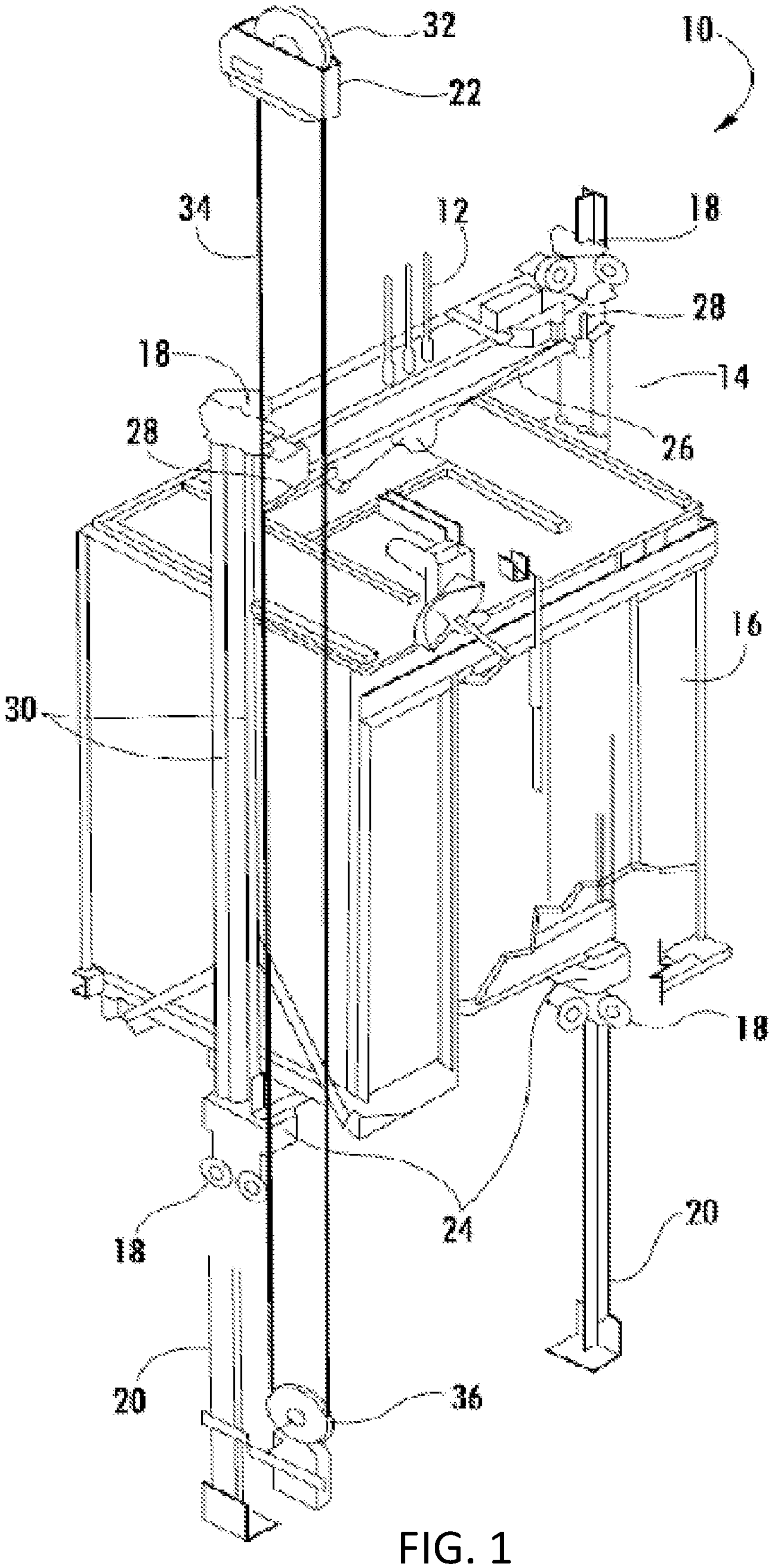
FIG. 1 shows an example of an elevator system employing a mechanical governor.

FIG. 1 shows an elevator system, generally indicated at 10. The elevator system 10 includes cables or belts 12, a car frame 14, an elevator car 16, roller guides 18, guide rails 20, a governor 22, and a pair of safety brakes 24 mounted on the elevator car 16. The governor 22 is mechanically coupled to actuate the safety brakes 24 by linkages 26, levers 28, and lift rods 30. The governor 22 includes a governor sheave 32, rope loop 34, and a tensioning sheave 36. The cables 12 are connected to the car frame 14 and a counterweight (not shown) inside a hoistway. The elevator car 16, which is attached to the car frame 14, moves up and down the hoistway by a force transmitted through the cables or belts 12 to the car frame 14 by an elevator drive (not shown) commonly located in a machine room at the top of the hoistway. The roller guides 18 are attached to the car frame 14 to guide the elevator car 16 up and down the hoistway along the guide rails 20. The governor sheave 32 is mounted at an upper end of the hoistway. The rope loop 34 is wrapped partially around the governor sheave 32 and partially around the tensioning sheave 36 (located in this example at a bottom end of the hoistway). The rope loop 34 is also connected to the elevator car 16 at the lever 28, ensuring that the angular velocity of the governor sheave 32 is directly related to the speed of the elevator car 16.

In the elevator system 10 shown in FIG. 1, the governor 22, a machine brake (not shown) located in the machine room, and the safety brakes 24 act to stop the elevator car 16 if it exceeds a set speed as it travels inside the hoistway. If the elevator car 16 reaches an over-speed condition, the governor 22 is triggered initially to engage a switch, which in turn cuts power to the elevator drive and drops the machine brake to arrest movement of the drive sheave (not shown) and thereby arrest movement of elevator car 16. If, however, the elevator car 16 continues to experience an overspeed condition, the governor 22 may then act to trigger the safety brakes 24 to arrest movement of the elevator car 16 (i.e. an emergency stop). In addition to engaging a switch to drop the machine brake, the governor 22 also releases a clutching device that grips the governor rope 34. The governor rope 34 is connected to the safety brakes 24 through mechanical linkages 26, levers 28, and lift rods 30. As the elevator car 16 continues its descent, the governor rope 34, which is now prevented from moving by the actuated governor 22, pulls on the operating levers 28. The operating levers 28 actuate the safety brakes 24 by moving the linkages 26 connected to the lift rods 30, and the lift rods 30 cause the safety brakes 24 to engage the guide rails 20 to bring the elevator car 16 to a stop.

It will be appreciated that, whilst a roped elevator is described here, the examples of a frictionless safety brake actuator described here will work equally well with a ropeless elevator system e.g. hydraulic, pinched wheel propulsion systems, systems with linear motors, or any other desired means of propelling an elevator car.

Whilst mechanical speed governor systems are still in use in many elevator systems, others (e.g. ropeless elevator systems without mechanical speed governor systems) are now implementing electronically or electrically actuated systems to trigger the emergency safety brakes 24. Most of these electronically or electrically actuated systems use friction between a magnet and the guide rail 20 to then mechanically actuate a linkage to engage the emergency safety brakes 24. Examples of a safety brake actuator are disclosed herein which do not utilize friction against the guide rail 20 to actuate the safety brakes 24.

In the description of the following examples of frictionless safety brake actuators, the terms “left”, “right”, “up”, “down”, “above”, “below” and similar positional and directional terms are used to refer to certain depicted features. These terms are used purely for convenience to refer to the position or orientation of those features when viewed in the figures, and do not necessarily imply any requirement on position or orientation of those features in frictionless safety brake actuators in accordance with the disclosure.

Figure 2B:
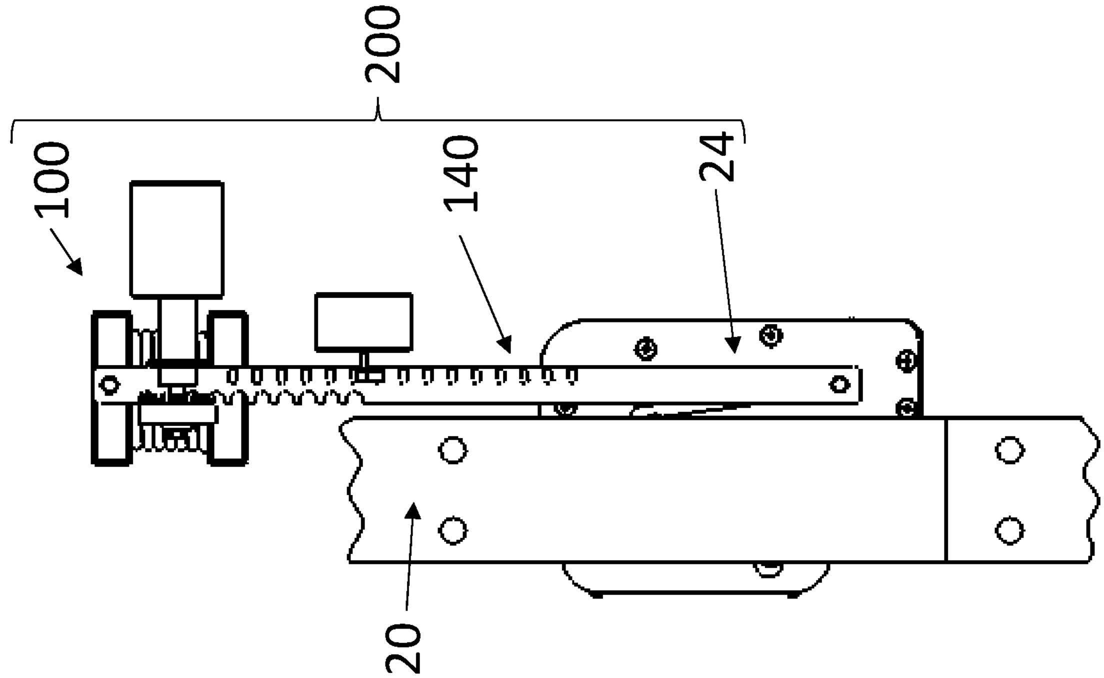
FIG. 2B shows the braking system from a second side view.
Figure 2A:
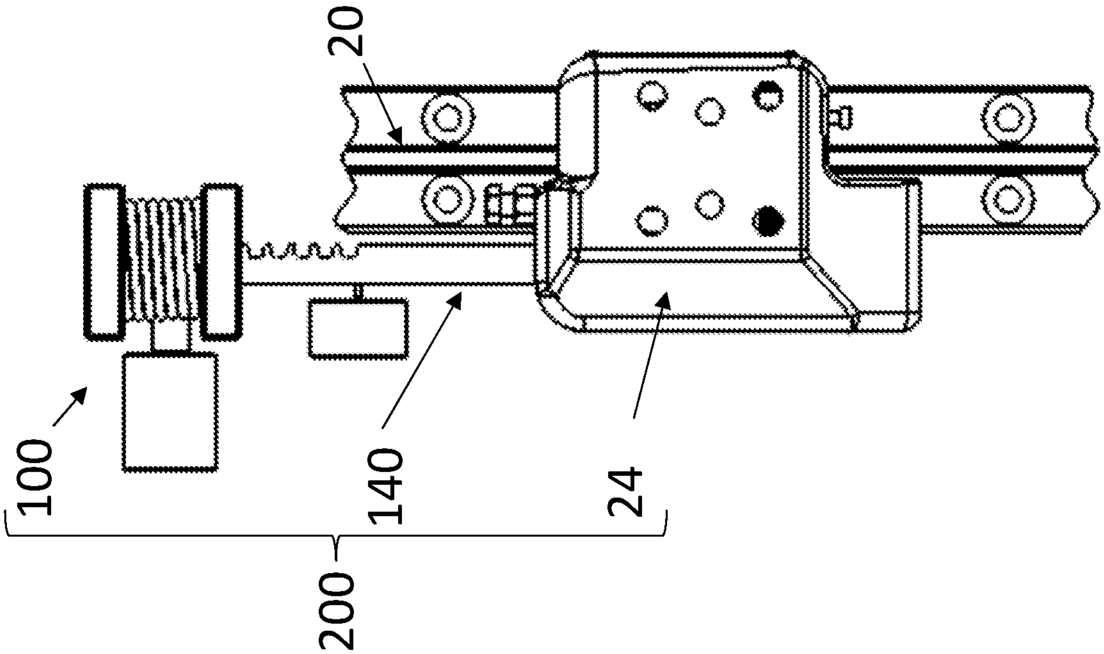
FIG. 2A shows a braking system according to an example of the present disclosure from a first side view.

FIGS. 2A and 2B show an example braking system 200 with a guide rail 20. The braking system 200 has a frictionless safety brake actuator 100 connected via a linkage 140 to the safety brake 24 (e.g. the safety brake 24 on an elevator car as shown in FIG. 1). The braking system 200 may be mounted on any moving component of the elevator system 10 which can move on a guide rail 20 The frictionless safety brake actuator 100 is mechanically connected to the safety brake 24 via the linkage 140.

The frictionless safety brake actuator 100 is positioned above the safety brake 24 and adjacent to the guide rail 20, although other positions are possible, e.g. the frictionless safety brake actuator 100 may be in a position that is not adjacent to the guide rail 20 as it does not require frictional contact with the guide rail 20 during its operation. In the event that the safety brake 24 needs to be engaged (e.g. in an elevator car overspeed situation), a controller (not shown) can send a signal to the frictionless safety brake actuator 100 to engage the safety brake 24. In response to the signal, the movable component (not shown) in the frictionless safety brake actuator 100 exerts a pulling force on the linkage 140. The pulling force is transmitted via the linkage 140 to the safety brake 24, pulling the safety brake 24 into frictional engagement with the guide rail 20, bringing the elevator car to a stop.

In this example the linkage 140 directly connects the frictionless safety brake actuator 100 to the safety brake 24, i.e. it acts in a similar manner to that described with reference to FIG. 1. In other examples, the frictionless safety brake actuator 100 acts via an intermediary actuating element which then connects to a linkage which actuates the safety brake.

The frictionless safety brake actuator 100 may, for example, operate as according to the example of a frictionless safety brake actuator 100 described below with reference to FIGS. 3A-7B.

FIGS. 3A-7B show a frictionless safety brake actuator 100 according to the present disclosure. The frictionless safety brake actuator has a fixed component 110, a biasing element 120, a movable component 130, a linkage 140, a holding arrangement 150 and a reset system 160. The linkage 140 is an actuating element for a safety brake as already described in relation to FIGS. 2A and 2B. The holding arrangement 150 comprises a first actuator 152 that controls the movement of a latch 154 that can engage with the linkage 140. The reset system 160 comprises a second actuator 162 that controls the movement of a gear 164 which can also engage with the linkage 140. The linkage 140 is attached to the movable component 130. In the illustrated example, the linkage 140 is a linkage that extends down to a safety brake, and the movable component 130 is moveable between a second (lower) position and a first (upper) position in which the safety brake is actuated by pulling up the linkage 140.

Figure 3B:
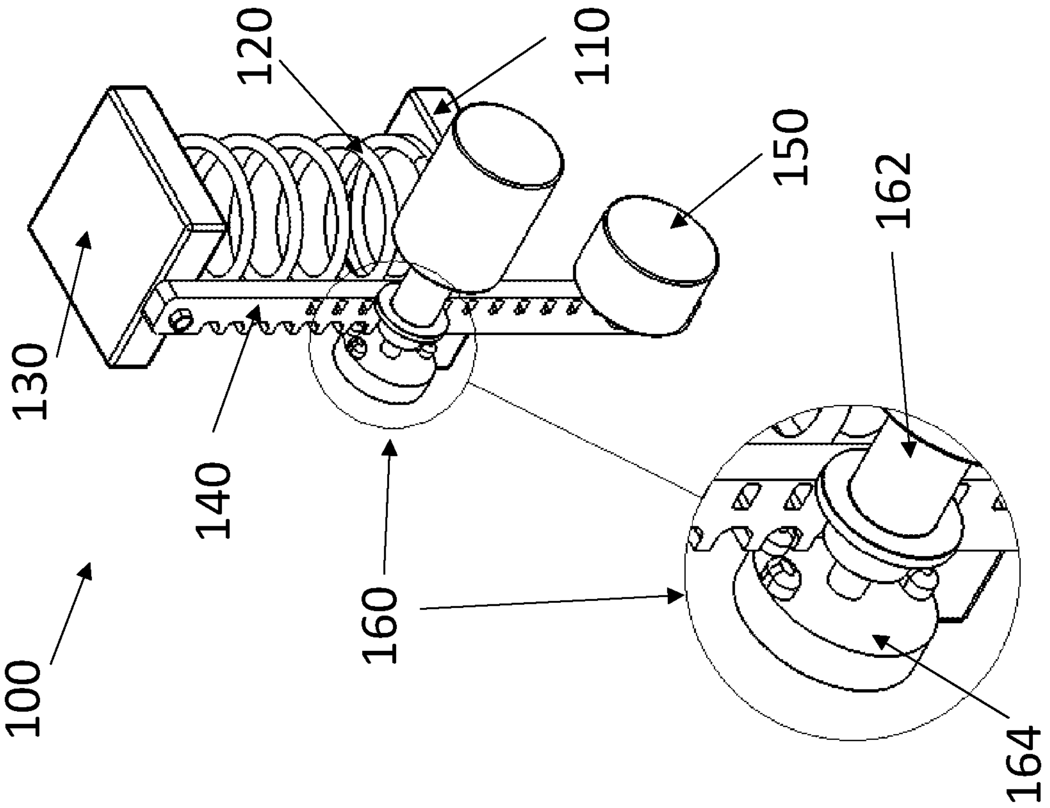
FIG. 3B shows another perspective view of the frictionless safety brake actuator, showing a magnified view of a gearing system.
Figure 3A:
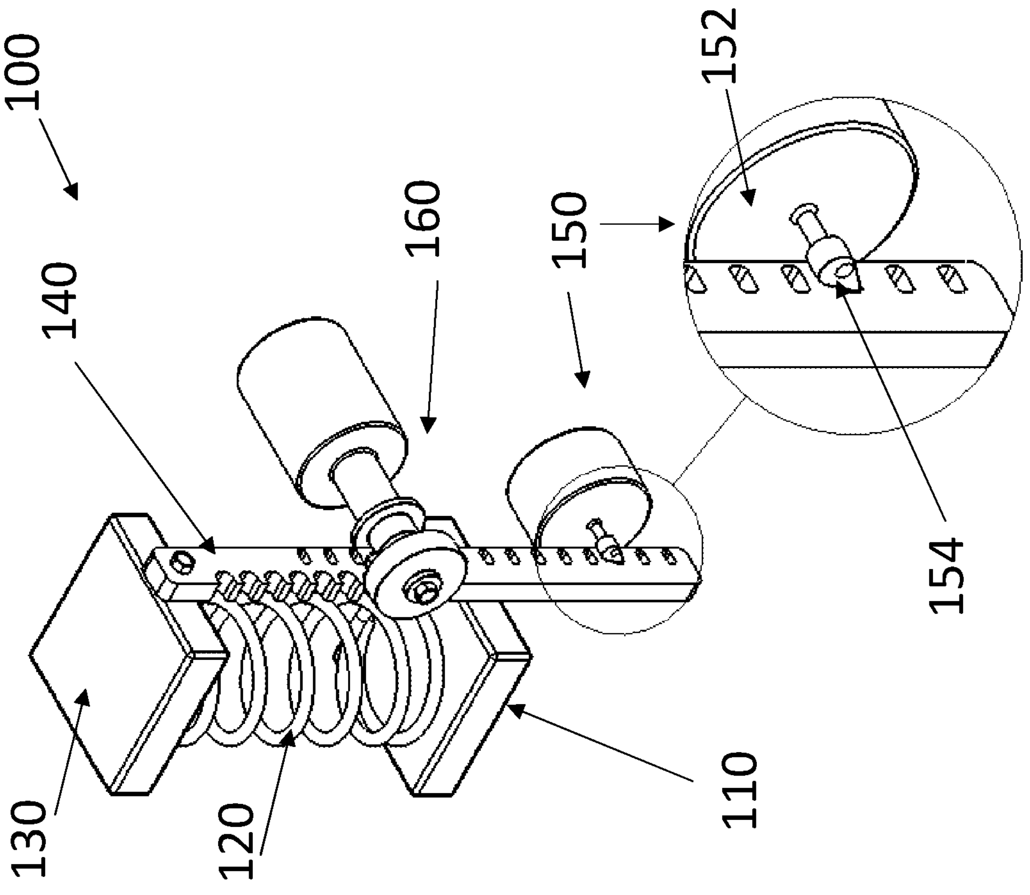
FIG. 3A shows a perspective view of a frictionless safety brake actuator according to the present disclosure, showing a magnified view of a holding arrangement.

FIG. 3A and FIG. 3B show the frictionless safety brake actuator 100 from two different perspectives, to clearly show how the holding arrangement 150 and the reset system 160 interact with the linkage 140.

The fixed component 110 is fixed relative to the component of the elevator system requiring braking (e.g. an elevator car). Between the fixed component 110 and the movable component 130 is a biasing member 120 designed to bias the movable component 130 to a first (upper) position where the safety brake 24 is actuated. In the example shown, the biasing member 120 is a compression spring. The movable component 130 is held in a second (lower) position against the bias of the biasing member 120 by the latch 154 of the holding arrangement 150 engaging with the linkage 140.

FIG. 3A gives a magnified view of the holding arrangement 150. In an example, the first actuator 152 is a rotary solenoid and is operated to move the latch 154 into and out of engagement with the linkage 140. When the latch 154 is in engagement with the linkage 140 it prevents any movement of the linkage 140, and therefore prevents spring-biased upwards movement of the movable component 130.

FIG. 3B gives a magnified view of the reset system 160, which is used to reset the frictionless safety brake actuator 100. The gear 164 engages with the linkage 140 and the second actuator (e.g. motor) 162 drives the gear 164 to move the movable component 130 downwards back to its second (lower) position. This is described in further detail below.

In this example, the reset system 160 is shown next to the fixed component 110 and above the holding arrangement 150, however the skilled person will see from the foregoing description that the position of the holding arrangement 150 and reset system 160 can be anywhere, so long as they engage with the linkage 140 in a suitable manner.

The reset system 160 is arranged to allow movement of the linkage 140 when the frictionless safety brake actuator 100 is activated, so that the movable component 130 can move upwards to its first position. The reset system 160 is operable to drive movement of the linkage 140 so as to return the movable component 130 from its first (i.e. triggered) position to its second (i.e. rest) position during a reset procedure.

Figure 4B:
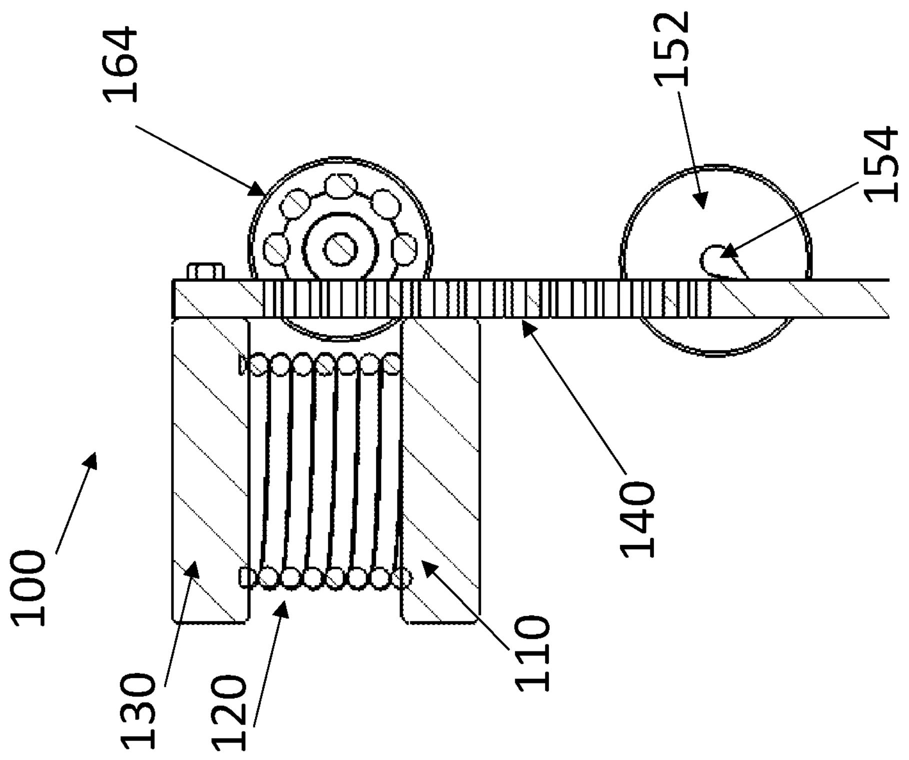
FIG. 4B shows the frictionless safety brake actuator during normal operation from a second side view.
Figure 4A:
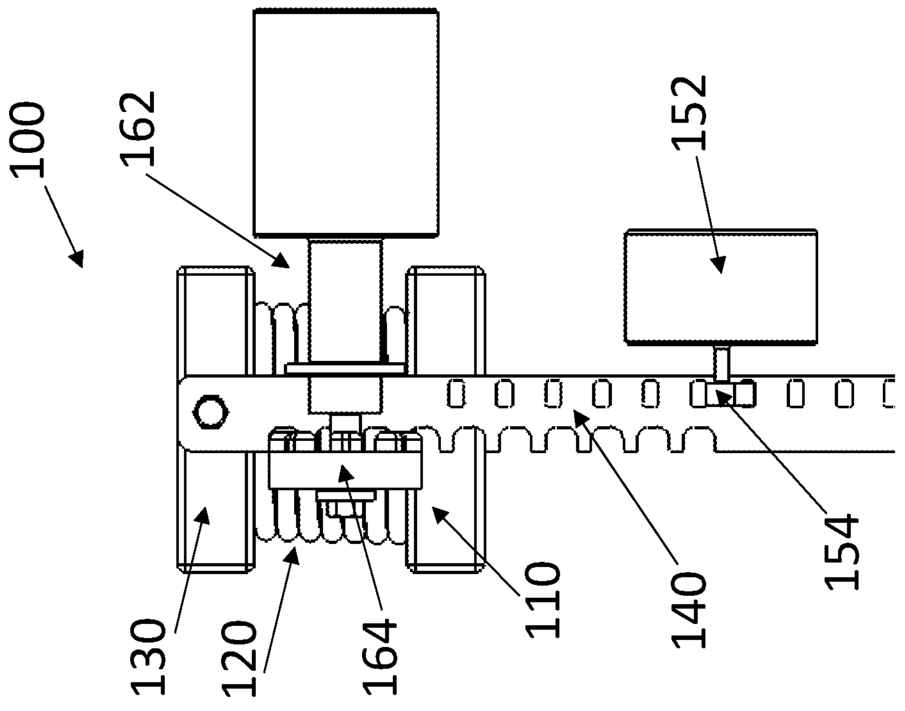
FIG. 4A shows the frictionless safety brake actuator during normal operation from a first side view.

FIG. 4A and FIG. 4B show the frictionless safety brake actuator 100 during normal operation of the elevator system, where the compression spring of the biasing element 120 is compressed between the fixed component 110 and the movable component 130, because the linkage 140 is held in place by the engagement of the latch 154. The holding arrangement 150 is holding the linkage 140 against any upwards force of the biasing element 120.

The gear 164 is shown to have teeth for part of its arc of rotation, but no teeth on a second part of the arc of rotation. When the movable component 130 is in the second (lower) position, the gear 164 is not engaged with the linkage 140, as the gear 164 is rotated so the side without teeth is positioned by the linkage 140 as shown in FIG. 4B.

Figure 5B:
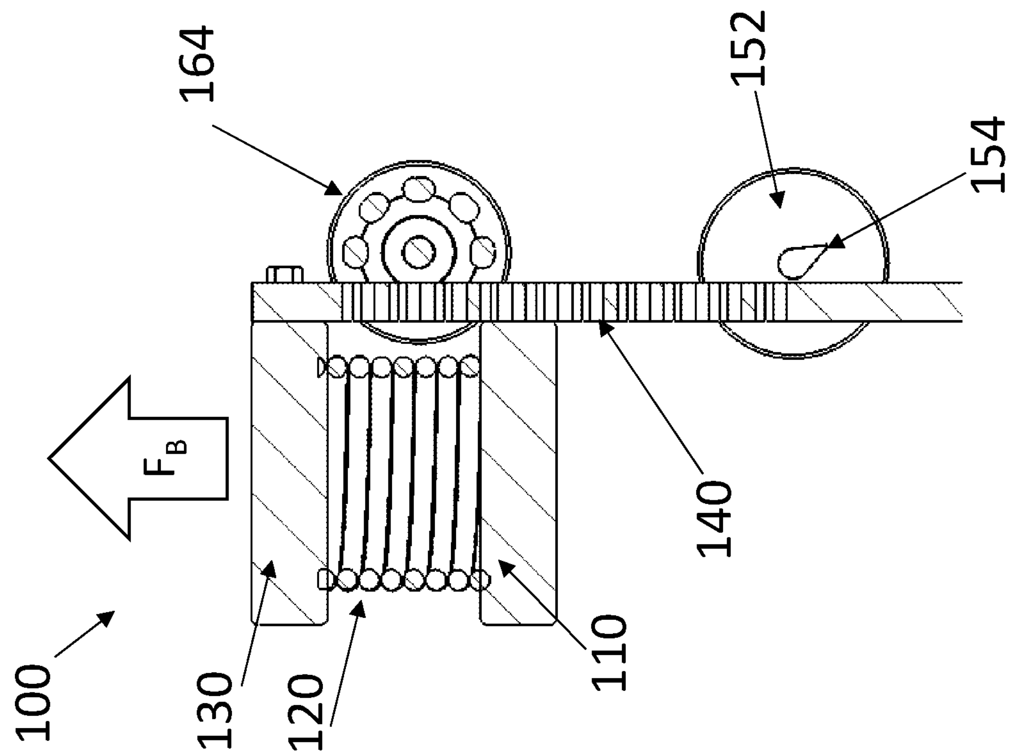
FIG. 5B shows the frictionless safety brake actuator during actuation from the second side view.
Figure 5A:
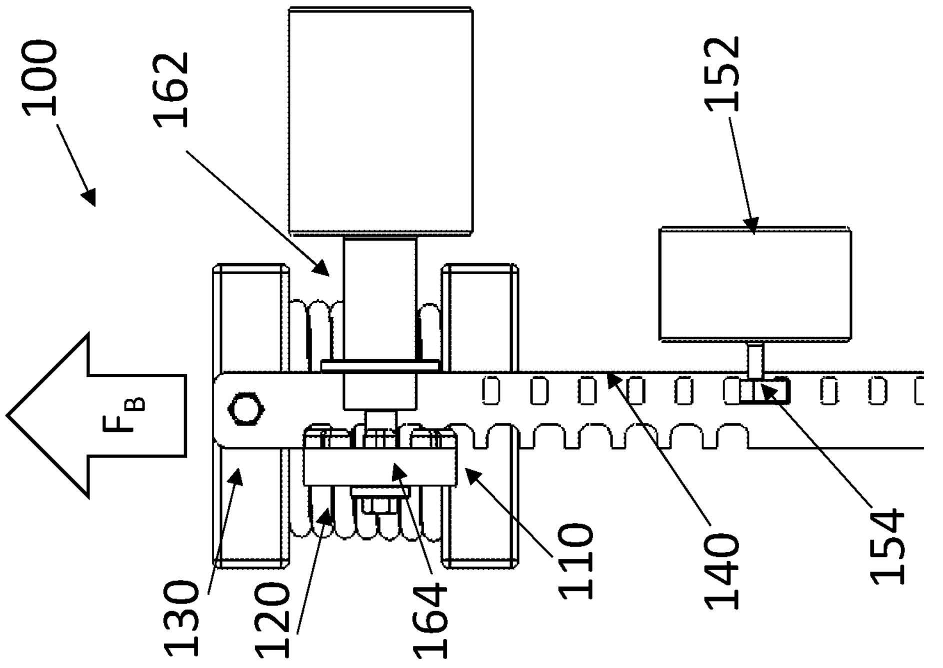
FIG. 5A shows the frictionless safety brake actuator during actuation from the first side view.

In FIG. 5A and FIG. 5B, the latch 154 has been rotated out of engagement with the linkage 140 by the first actuator 152, to allow for upward movement of the movable component 130. The movement of the linkage 140 is not influenced by the gear 164 of the reset system 160, due to the positioning of the teeth of the gear 164 away from the path of the movement of the linkage 140. The holding arrangement 150 may be configured for failsafe or non-failsafe operation. In a failsafe system any interruption of power will actuate the emergency safety brake. In a non-failsafe system power is required to actuate the emergency safety brake.

In the failsafe example, the first actuator 152 is a rotary solenoid, and when the rotary solenoid is deactivated the latch 154 is automatically moved out of engagement with the linkage 140, which allows the movable component 130 to be pushed upwards by the biasing force FB of the biasing element 120. The holding arrangement 150 may also comprise a spring (not shown) arranged to bias the latch 154 out of engagement with the linkage 140, where the rotary solenoid holds the latch 154 in engagement with the linkage 140 against the spring force of the spring. The spring may be a torsion spring. The spring may be a component of the rotary solenoid. Hence, when the rotary solenoid is either triggered to be deactivated by a signal from the elevator system, or when there is an interruption of power (e.g. a power cut to a building) the latch 154 will rotate out of engagement with the linkage 140 so the movable component 130 will be moved upwards by the biasing force FB of the biasing element 120, pulling up the linkage 140, so as to actuate an emergency safety brake connected thereto.

In the non-failsafe example, the first actuator 152 is activated to move the latch 154 out of engagement with the linkage 140. The movable component 130 is then pushed upwards by the biasing force FB of the biasing element 120. In the non-failsafe example the first actuator 152 may be a rotary solenoid, however the skilled person will see that other actuation methods would also be suitable for moving of the latch 154 as required, e.g. a motor. In this example, no power is required for the frictionless safety brake actuator 100 during normal operation. Instead power is required for the activation of the frictionless safety brake actuator 100.

Figure 6B:
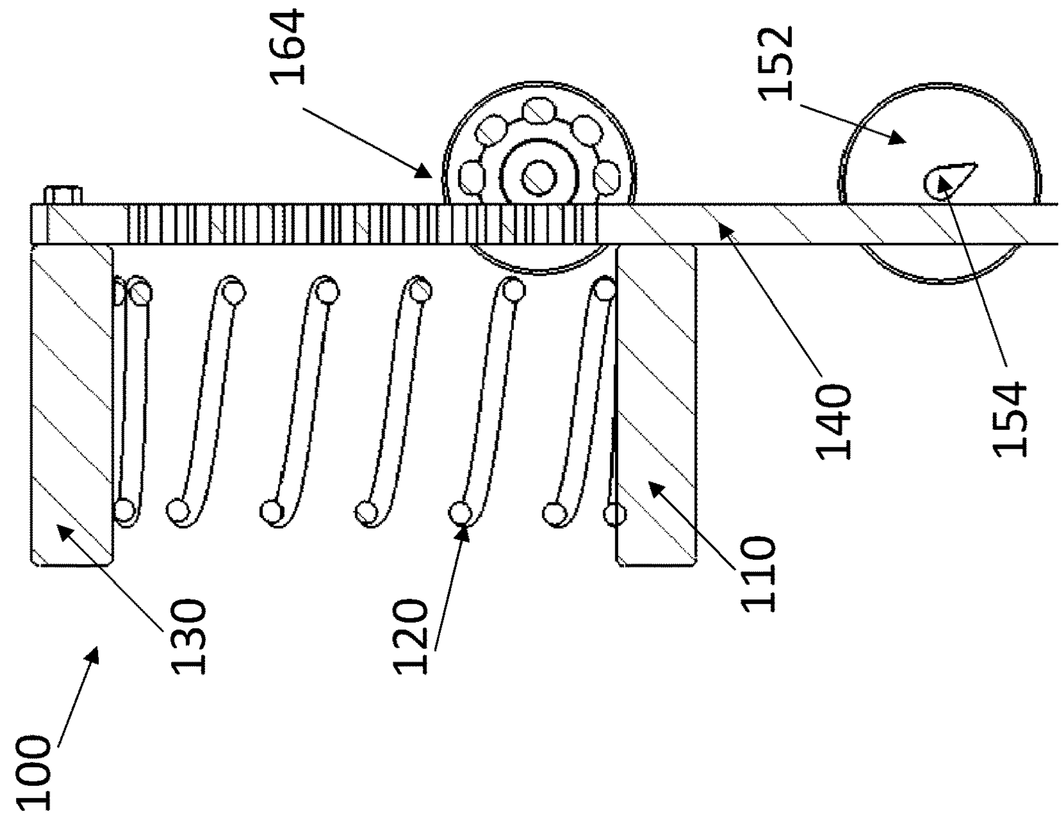
FIG. 6B shows the frictionless safety brake actuator in the actuated position from the second side view.
Figure 6A:
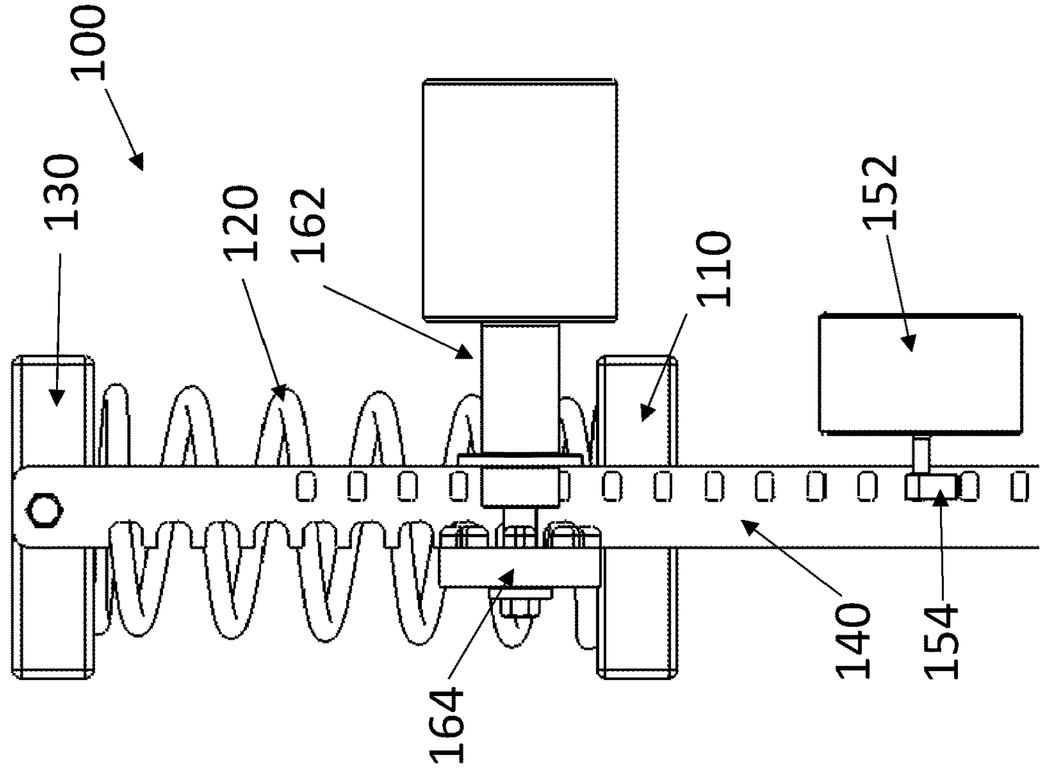
FIG. 6A shows the frictionless safety brake actuator in the actuated position from the first side view.

The movable component 130 moves from the second (lower) position shown in FIG. 5A and FIG. 5B, to the first (upper) position as shown in FIG. 6A and FIG. 6B, where the compression spring of the biasing element 120 has released its elastic energy, and the linkage 140 has actuated the safety brake. Whilst in this example, the gear 164 is shown with no teeth on the side near the linkage 140, the skilled person will appreciate that various arrangements of the second actuator 162 and a gear 164 would allow for unrestrained movement of the linkage 140 during actuation. The reset system 160 is designed only to aid with the reset of the actuator 100 from the first (i.e. triggered) position shown in FIGS. 6A and 6B, back to the second (i.e. rest) position of FIG. 4A and FIG. 4B, and to provide minimal resistance, and preferably no resistance to the movement of the linkage 140 during actuation.

Figure 7B:
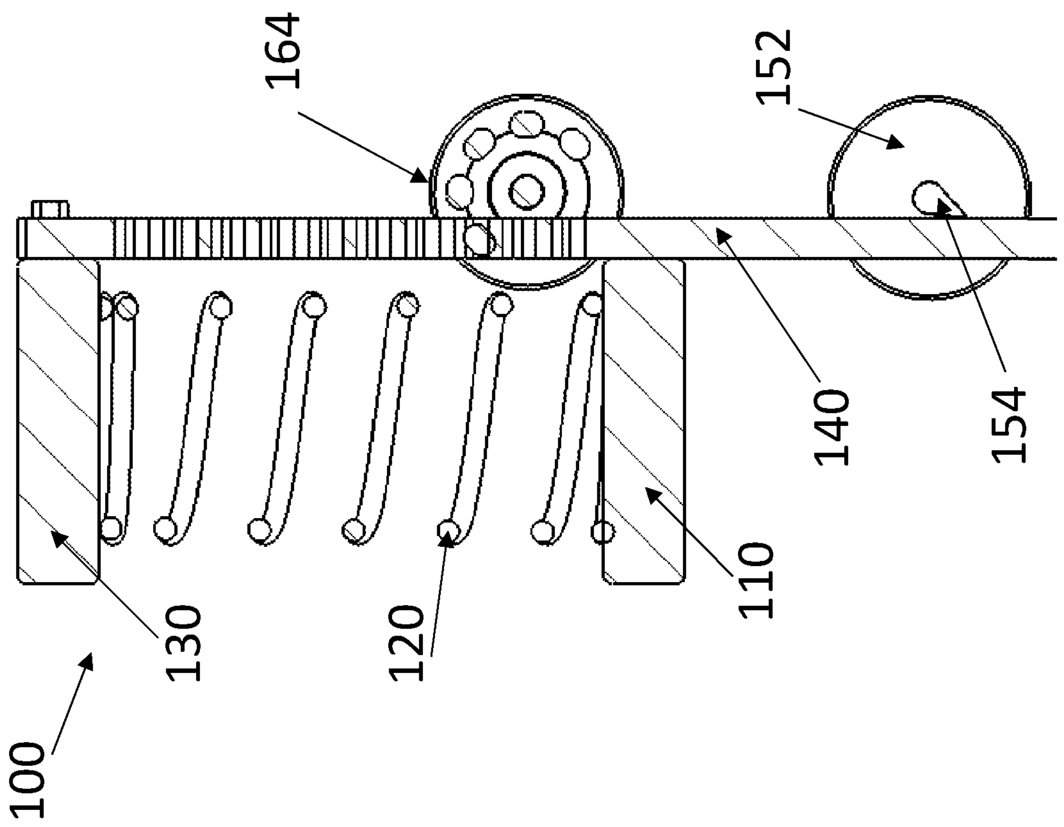
FIG. 7B shows the frictionless safety brake actuator during reset from the second side view.
Figure 7A:
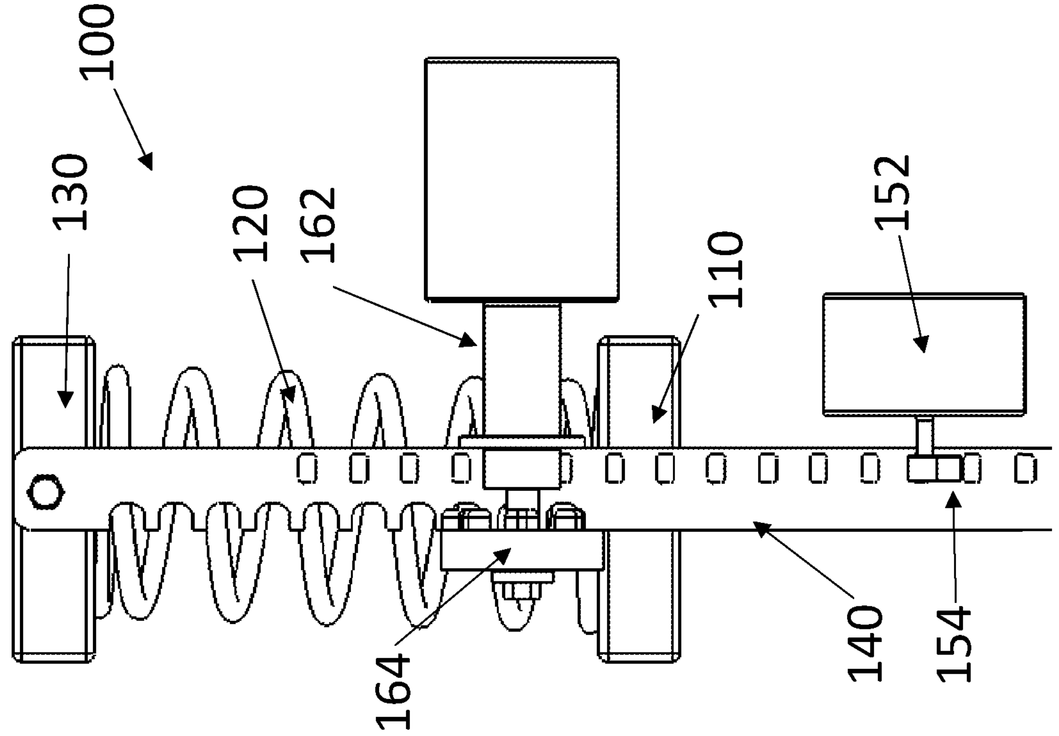
FIG. 7A shows the frictionless safety brake actuator during reset from the first side view.

FIG. 7A and FIG. 7B show the frictionless safety brake actuator 100 at the beginning of the reset procedure. The latch 154 can be arranged to allow for movement of the linkage 140 in the downwards direction, whilst preventing movement of the linkage 140 in the upwards direction. The first actuator 152 can rotate the latch 154 back into engagement with the linkage 140, whilst the movable component 130 is in the first position, as shown in FIG. 7A and FIG. 7B. linkage. At this stage the second actuator 162 has rotated the teeth of the gear 164 to engage with the linkage 140. The second actuator 162 then rotates the gear 164 to drive the linkage 140 downwards and move the movable component 130 against the bias of the biasing element 120 and back to the second position. In this example, the linkage 140 acts as a rack, and the gear 164 acts as a pinion, so the rotation of the gear 164 drives the linear movement of the linkage 140. In this way the frictionless safety actuator 100 is returned to the rest position as shown in FIG. 4A and FIG. 4B.

In another example, the latch 154 may be rotated back into engagement with the linkage 140 when the movable component 130 has returned to the second position and the biasing element 120 is fully returned to its original state (i.e. the compression spring has been fully compressed).

Once the movable component 130 is fully returned to the second (lower) position, and the latch 154 is engaged with the linkage 140 to prevent upwards movement of the movable component 130, the second actuator 154 can then move the gear 164 so the teeth are no longer engaged with the linkage 140.

In failsafe examples, the rotary solenoid of the first actuator 152 is activated to rotate the latch 154 into engagement with the linkage 140. Where the holding arrangement 150 also comprises a spring as mentioned above, the activation of the rotary solenoid acts against the bias of the spring.

In non-failsafe examples, if the first actuator 152 is a rotary solenoid, the rotary solenoid is deactivated for the latch 154 to move into a position of engagement with the linkage 140. The holding arrangement 150 may also comprise a spring (not shown) arranged to bias the latch 154 into engagement with the linkage 140, where the rotary solenoid holds the latch 154 out of engagement with the linkage 140 against the spring force of the spring. The spring may be a torsion spring. The spring may be a component of the rotary solenoid. Hence, when the rotary solenoid is deactivated the spring force of the spring biases the latch 154 into engagement with the linkage 140. If the first actuator 152 is a motor, the motor is operated in a opposite direction to the direction used for triggering the frictionless safety brake actuator 100, to move the latch 154 back into engagement with the linkage 140.

It will be appreciated by those skilled in the art that while the reset system 160 in the example of FIGS. 2-7 has a single gear 164, other gearing systems may also be suitable, e.g. multiple gears. Furthermore, whilst in this example the gear 164 doesn't engage with the linkage 140 during actuation, by nature of only having teeth for part of its arc of rotation, unrestricted movement of the linkage 140 may be possible using other reset system 160 arrangements. In an example a normal gear which becomes disengaged from the second actuator 162 (e.g. a motor) is used, so when the frictionless safety brake actuator 100 is activated the gear is free to rotate with the movement of the linkage 140.

The skilled person will appreciate that whilst some examples are given here describing the manner in which the holding arrangement 150 and reset system 160 can operate, other configurations may also be suitable.

It will be appreciated by those skilled in the art that the disclosure has been illustrated by describing one or more specific aspects thereof, but is not limited to these aspects; many variations and modifications are possible, within the scope of the accompanying claims.

What is claimed is:

1. A frictionless safety brake actuator (100) for use in an elevator system (10), comprising:

a fixed component (110);

a movable component (130), configured to be moveable between a first position in which a safety brake (24) is actuated and a second position in which the safety brake (24) is not actuated;

a biasing element (120) arranged between the fixed component (110) and the movable component (130) to apply a biasing force (FB) to the movable component (130) to bias the movable component (130) away from the fixed component (120) towards the first position;

an actuating element (140) connected to the movable component (130), wherein the actuating element (140) is configured to actuate a safety brake (24) so as to move the safety brake (24) into frictional engagement with an elevator guide rail (20);

a holding arrangement (150) comprising a latch (154) and a first actuator (152), wherein the first actuator (152) is configured to be selectively operable to move the latch (154) between a holding position and a release position;

wherein, in the holding position, the latch (154) is configured to prevent movement of the movable component (130) out of the second position, and wherein the first actuator (152) is configured to move the latch (154) into the release position to allow the biasing force (FB) of the biasing element (120) to move the movable component (130) from the second position to the first position; and a reset system (160) comprising a gear (164) and a second actuator (162), wherein the gear (164) is configured to engage with the actuating element (140);

wherein the second actuator (162) is configured to drive the gear (164) to move the movable component (130) from the first position to the second position against the biasing force (FB) of the biasing element (120);

wherein the second actuator (162) is a motor.

2. A frictionless safety brake actuator (100) according to claim 1, wherein, in the holding position, the latch (154) is configured to engage with the actuating element (140).

3. A frictionless safety brake actuator (100) according to claim 2, wherein the holding arrangement (150) is further configured such that when the latch (154) is engaged with the actuating element (140):

the holding arrangement (150) prevents movement of the actuating element (140) in a first direction corresponding to the movement of the movable component (130) from the second position to the first position; and the holding arrangement (150) does not restrict movement of the actuating element (140) in a second direction corresponding to the movement of the movable component (130) from the first position to the second position.

4. A frictionless safety brake actuator (100) according to claim 1, wherein the first actuator (152) is a rotary solenoid arranged to move the latch (154) between the holding position and the release position.

5. A frictionless safety brake actuator (100) according to claim 4, wherein the holding arrangement (150) further comprises a torsion spring configured to bias the latch (154) to the release position.

6. A frictionless safety brake actuator according to claim 1, wherein the first actuator (152) is configured to be deactivated to move the latch (154) to the holding position and keep the latch (154) in the holding position.

7. A frictionless safety brake actuator (100) according to claim 1, wherein the actuating element is a linkage (140) which directly actuates the safety brake (24).

8. A frictionless safety brake actuator (100) according to claim 1, wherein the actuating element (140) is a rack and the gear (164) is a pinion.

9. A frictionless safety brake actuator (100) according to claim 1, wherein the biasing element (120) is a compression spring.

10. A frictionless safety brake actuator (100) according to claim 1, wherein the motor is a stepper motor.

11. A braking system (200) for use on a movable component (16) in an elevator system (10), the braking system comprising:

a safety brake (24); and a frictionless safety brake actuator (100) according to claim 1;

wherein the actuating element (140) is configured to actuate the safety brake (24) so as to move the safety brake (24) into frictional engagement with an elevator guide rail (20).

12. An elevator system (10) comprising:

a guide rail (20);

an elevator component (16) movable along the guide rail (20); and a braking system according to claim 11.

13. A frictionless safety brake actuator (100) for use in an elevator system (10), comprising:

a fixed component (110);

a movable component (130), configured to be moveable between a first position in which a safety brake (24) is actuated and a second position in which the safety brake (24) is not actuated;

a biasing element (120) arranged between the fixed component (110) and the movable component (130) to apply a biasing force (FB) to the movable component (130) to bias the movable component (130) away from the fixed component (120) towards the first position;

an actuating element (140) connected to the movable component (130), wherein the actuating element (140) is configured to actuate a safety brake (24) so as to move the safety brake (24) into frictional engagement with an elevator guide rail (20);

a holding arrangement (150) comprising a latch (154) and a first actuator (152), wherein the first actuator (152) is configured to be selectively operable to move the latch (154) between a holding position and a release position;

wherein, in the holding position, the latch (154) is configured to prevent movement of the movable component (130) out of the second position, and wherein the first actuator (152) is configured to move the latch (154) into the release position to allow the biasing force (FB) of the biasing element (120) to move the movable component (130) from the second position to the first position; and a reset system (160) comprising a gear (164) and a second actuator (162), wherein the gear (164) is configured to engage with the actuating element (140);

wherein the second actuator (162) is configured to drive the gear (164) to move the movable component (130) from the first position to the second position against the biasing force (FB) of the biasing element (120);

wherein the first actuator (152) is a rotary solenoid arranged to move the latch (154) between the holding position and the release position;

wherein the rotary solenoid is configured to be activated to move the latch (154) to the holding position and keep the latch (154) in the holding position.

14. A frictionless safety brake actuator (100) according to claim 13, wherein the holding arrangement (150) further comprises a torsion spring configured to bias the latch (154) to the release position.

15. A frictionless safety brake actuator (100) for use in an elevator system (10), comprising:

a fixed component (110);

a movable component (130), configured to be moveable between a first position in which a safety brake (24) is actuated and a second position in which the safety brake (24) is not actuated;

a biasing element (120) arranged between the fixed component (110) and the movable component (130) to apply a biasing force (FB) to the movable component (130) to bias the movable component (130) away from the fixed component (120) towards the first position;

an actuating element (140) connected to the movable component (130), wherein the actuating element (140) is configured to actuate a safety brake (24) so as to move the safety brake (24) into frictional engagement with an elevator guide rail (20);

a holding arrangement (150) comprising a latch (154) and a first actuator (152), wherein the first actuator (152) is configured to be selectively operable to move the latch (154) between a holding position and a release position;

wherein, in the holding position, the latch (154) is configured to prevent movement of the movable component (130) out of the second position, and wherein the first actuator (152) is configured to move the latch (154) into the release position to allow the biasing force (FB) of the biasing element (120) to move the movable component (130) from the second position to the first position; and a reset system (160) comprising a gear (164) and a second actuator (162), wherein the gear (164) is configured to engage with the actuating element (140);

wherein the second actuator (162) is configured to drive the gear (164) to move the movable component (130) from the first position to the second position against the biasing force (FB) of the biasing element (120);

wherein the holding arrangement (150) further comprises a torsion spring configured to bias the latch (154) into the holding position.

16. A frictionless safety brake actuator according to claim 15, wherein the first actuator (152) is configured to be deactivated to move the latch (154) to the holding position and keep the latch (154) in the holding position.

17. A frictionless safety brake actuator (100) for use in an elevator system (10), comprising:

a fixed component (110);

a movable component (130), configured to be moveable between a first position in which a safety brake (24) is actuated and a second position in which the safety brake (24) is not actuated;

a biasing element (120) arranged between the fixed component (110) and the movable component (130) to apply a biasing force (FB) to the movable component (130) to bias the movable component (130) away from the fixed component (120) towards the first position;

an actuating element (140) connected to the movable component (130), wherein the actuating element (140) is configured to actuate a safety brake (24) so as to move the safety brake (24) into frictional engagement with an elevator guide rail (20);

a holding arrangement (150) comprising a latch (154) and a first actuator (152), wherein the first actuator (152) is configured to be selectively operable to move the latch (154) between a holding position and a release position;

wherein, in the holding position, the latch (154) is configured to prevent movement of the movable component (130) out of the second position, and wherein the first actuator (152) is configured to move the latch (154) into the release position to allow the biasing force (FB) of the biasing element (120) to move the movable component (130) from the second position to the first position; and a reset system (160) comprising a gear (164) and a second actuator (162), wherein the gear (164) is configured to engage with the actuating element (140);

wherein the second actuator (162) is configured to drive the gear (164) to move the movable component (130) from the first position to the second position against the biasing force (FB) of the biasing element (120);

wherein the gear (164) comprises teeth that engage with the actuating element (140) for part of the rotation of the gear (164), and no teeth for another part of the rotation of the gear (164) so as not to engage with the actuating element (140).

* * * * *